April 7, 1953          E. F. DALBY          2,633,756
MOTOR VEHICLE GEAR SHIFT ATTACHMENT
Filed April 14, 1950          2 SHEETS—SHEET 1
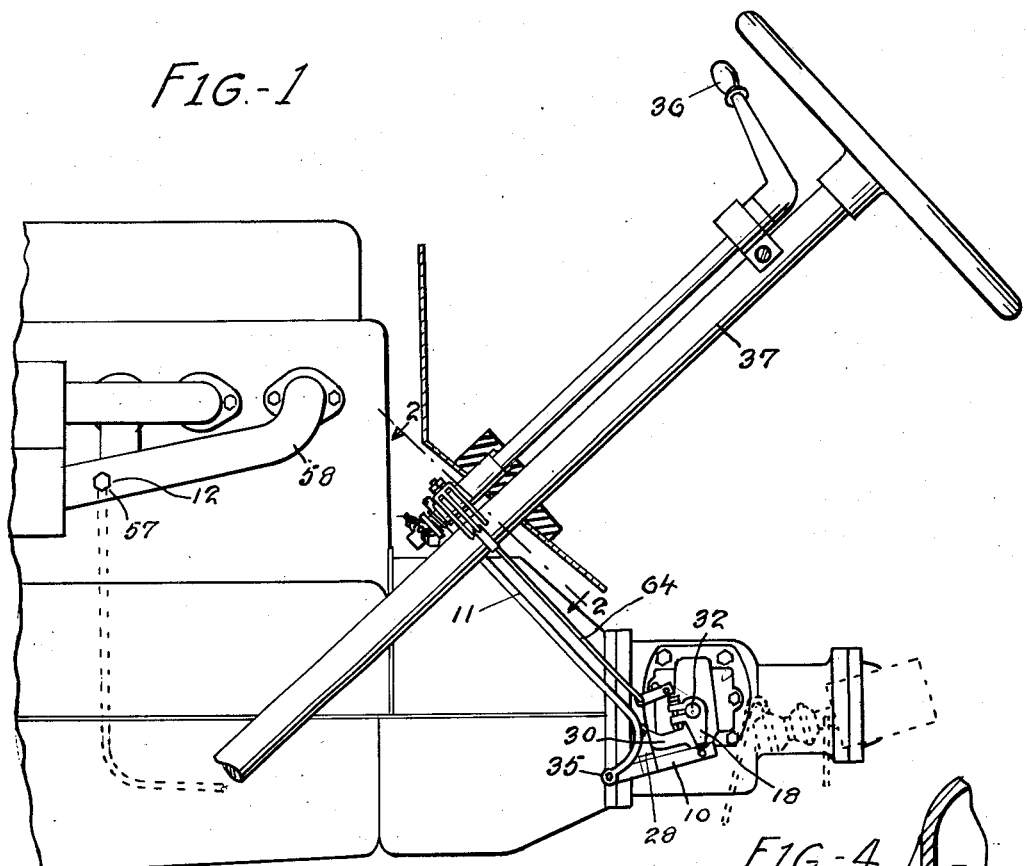
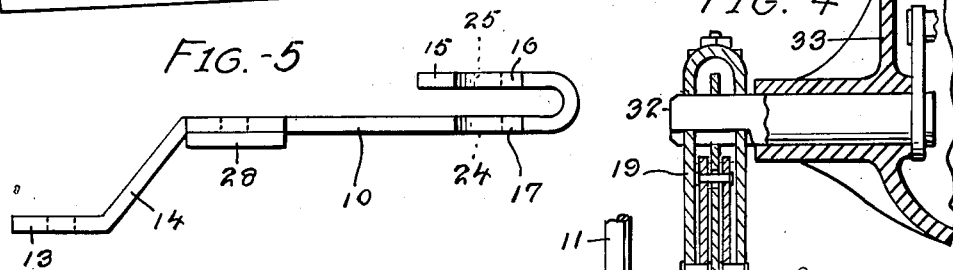
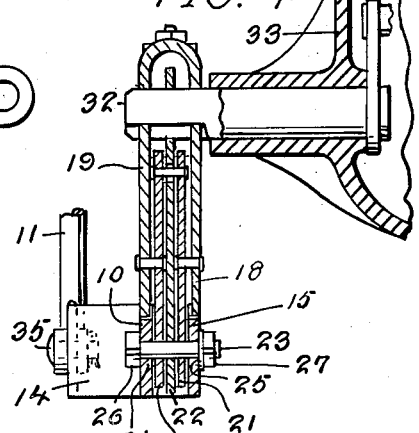
INVENTOR.
ELMER F. DALBY
BY *Victor J. Evans & Co.*
ATTORNEYS

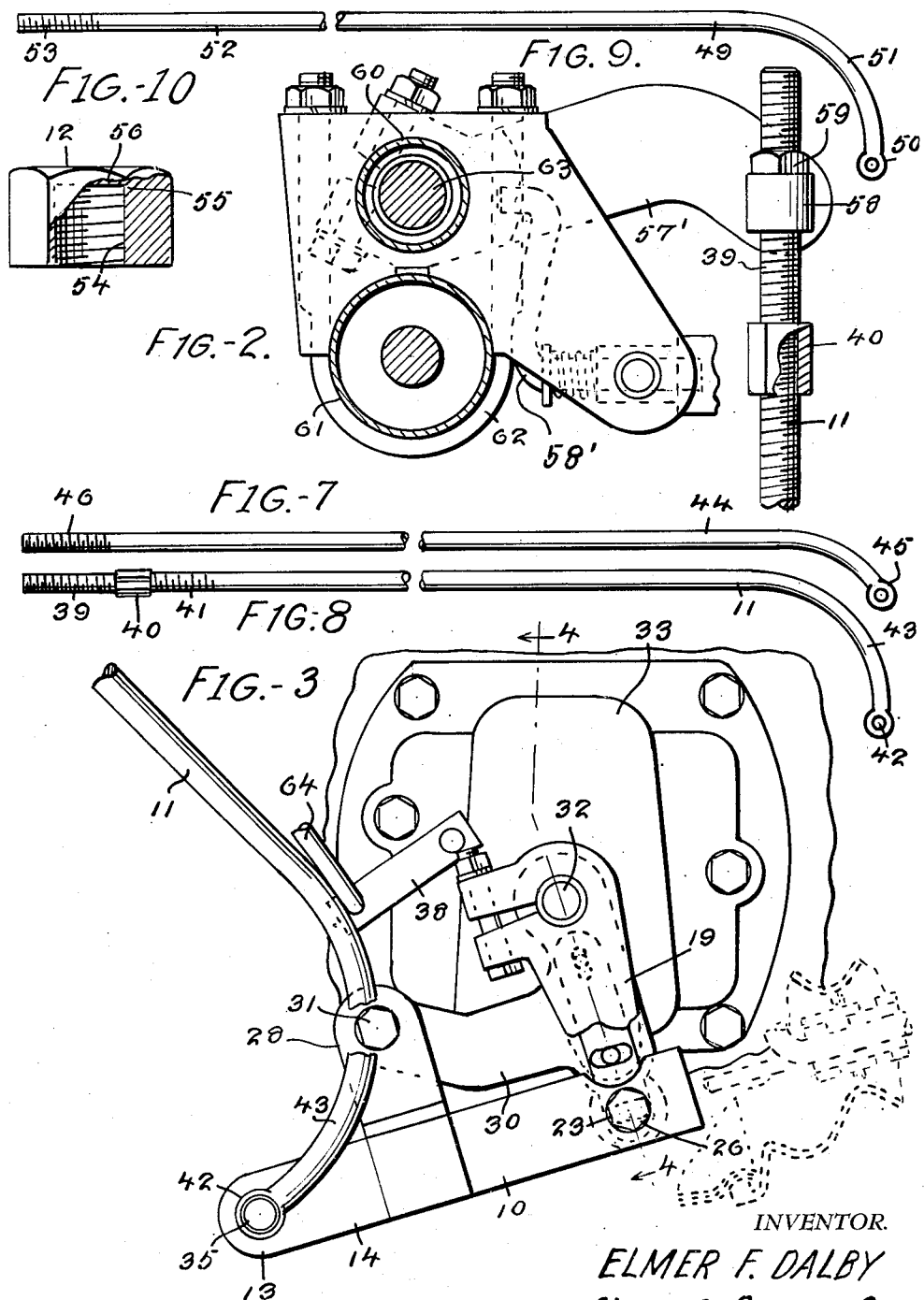

Patented Apr. 7, 1953

2,633,756

UNITED STATES PATENT OFFICE 2,633,756

MOTOR VEHICLE GEAR SHIFT ATTACHMENT

Elmer F. Dalby, Valley Head, Ala.

Application April 14, 1950, Serial No. 155,967

2 Claims. (Cl. 74—484)

This invention relates to attachments for motor vehicles particularly of the pleasure car type, and in particular a lever attached to the transmission operating lever of a motor vehicle gear assembly which replaces the vacuum cylinder assembly and connecting lines and eliminates the vacuum gear shift provided on some types of vehicles.

The purpose of this invention is to provide mechanical instrumentalities for replacing the vacuum gear shift of the transmission of a motor vehicle whereby the costly repairs normally required to maintain the vacuum gear shift in operating condition are eliminated.

In some motor vehicles of the pleasure car type a vacuum cylinder provides a vacuum gear shift for the transmission and because of the fluctuating vacuum pressures it is necessary to maintain accurate adjustment in the parts of the cylinder whereby repairs to the vacuum gear shift assembly are extensive and costly. With this thought in mind this invention contemplates an attachment connected to the transmission operating lever of the gear assembly at one end and to the gear shift control rod on the lower part of the steering wheel post at the other whereby the gear shift is positively actuated.

The object of this invention is, therefore, to provide a positive connection between the gear shift control rod on the lower end of the gear shift lever mounted on the steering wheel post of a motor vehicle and the transmission operating lever whereby the usual function of the vacuum gear shift is accomplished without the use of the vacuum cylinder and the associated parts.

Another object of the invention is to provide an operative connection between the gear shift lever mounted on the steering wheel post of a motor vehicle and the transmission operating lever that may be installed on motor vehicles now in use without materially changing the parts thereof.

A further object of the invention is to provide a positive connection between the gear shift lever and the transmission operating lever of a motor vehicle transmission which replaces the vacuum gear shift that is of a simple and economical construction.

With these and other objects and advantages in view this invention embodies a connecting bar having an offset end and a U-shaped end, and an offset plate extended upwardly from the intermediate part thereof, and means for changing the shape of the end of the gear shift control rod of the vehicle so that the rod will actuate the transmission operating lever to accomplish the same result as the vacuum cylinder of the vacuum gear shift.

Other features and advantages of the invention will appear from the following description taken in connection with the drawings wherein:

Figure 1 is a sectional view through the forward part of a motor vehicle showing the gear shift instrumentalities with the gear shift lever positioned on the post of a steering wheel and with the vacuum cylinder, which is replaced by the improved lever of this invention, shown in dotted lines.

Figure 2 is a sectional plan taken on line 2—2 of Figure 1 illustrating the connection of the upper end of the gear shift control rod to the gear shift hand lever.

Figure 3 is a side elevational view, on an enlarged scale, showing the gear box or transmission housing with the vacuum cylinder, which is indicated in dotted lines replaced by the improved lever of this invention.

Figure 4 is a vertical section taken on line 4—4 of Figure 3 illustrating the connection of the improved lever of this invention to the lower ends of the transmission operating levers.

Figure 5 is a plan view of the improved lever of this invention.

Figure 6 is a front elevational view of the improved lever.

Figure 7 is a detail illustrating the gear shift control rod used on motor vehicles for operating the vacuum gear shift.

Figure 8 is a similar view showing the improved gear shift control rod with one end formed to be connected to the end of the improved lever and the other provided with an extension.

Figure 9 is a similar view of the gear shift control rod showing a modification wherein the length of the rod is extended to compensate for the extension.

Figure 10 is a detail illustrating the closure cap for the manifold connection to be installed on the said connection when the vacuum cylinder is removed.

Referring now to the drawings wherein like reference characters denote corresponding parts the gear shift attachment of this invention includes a lever 10, a gear shift control rod 11 and a closure cap 12.

The lever 10 is formed as illustrated in Figures 5 and 6 with an offset end 13 connected to the body of the lever by a diagonally positioned section 14 and with the opposite end bent around to form a U providing an inner arm 15. The upper surface of the arm 15 is provided with a recess 16 and a corresponding recess 17 is provided in the upper edge of the body portion 10. The recesses 16 and 17 are positioned to receive the lower ends of arms 18 and 19 respectively with the end of the lever pivotally connected to the lower ends of the transmission operating levers 20, 21, and 22 by a bolt 23 which extends through openings 24 and 25 in the lever 10 and arm 15, respectively. The bolt 23 is provided with a head 26 and a nut 27, as shown in Figure 4.

The lever 10 is provided with an offset strap 28, the upper end of which is provided with an opening 29 through which the lever 10 is connected to an arm 30 which extends from one side of the lever 22, by a bolt 31. The upper end of the strap 28 is offset inwardly to engage the surface of the coacting side of the lever 22.

The transmission operating levers are carried by a shaft 32 extended from the transmission housing 33, as illustrated in Figures 3 and 4.

The outer end of the lever 10 is connected through an opening 34 to the gear shift control rod 11 by a pin 35 and with the lower end of the rod 11 bent inwardly as illustrated in Figures 3 and 8 the normal movement of the control rod by the hand lever 36 on the steering wheel post 37 actuates the lever 10 whereby the gears are shifted with the movement of the attachment so that, as an illustration, the gears may be shifted to first and reverse speeds with the lever 38 in one position and to second and high speed with the lever 38 in another position.

The upper end of the gear shift control rod 11 is provided with a threaded extension 39 having an internally threaded collar 40 on one end by which the extension is threaded on the threaded end 41 of the control rod. The opposite end of the rod 11 is provided with an eye 42 and, as illustrated in Figure 8 the lower end on which the eye 42 is positioned is formed with an arcuate section 43 whereby the lower end of the rod is positioned as shown in Figure 3 with the eye 42 connected to the lever 10 by the pin 35.

The gear shift control rod 11 replaces a somewhat similar rod 44, having an eye 45 on the lower end and provided with threads as indicated by the numeral 46, on the opposite end.

The rod 49, illustrated in Figure 9 and which is also provided with an eye 50 on an arcuate section 51 is provided with an extended end 52 which is threaded, as indicated by the numeral 53. This rod is a modification of the rod 11 showing the end of the rod extended to compensate for the extension 39.

A closure cap or nut 12 illustrated in Figure 10 is provided with a threaded core 54 which extends only to the point 55 whereby a web 56 is provided in the end of the nut to provide a closure so that with the nut positioned on the nipple provided at the point 57 of the intake manifold 58 the nipple may be closed when the connection to the vacuum cylinder is removed.

With the parts arranged in this manner the extension 39 on the upper end of the control rod 11 is connected to the control shift lever 57' by a stud 58 with a lock nut 59 threaded on the end of the extension. The lever 57' is mounted on a tubular gear shift shaft 60 that is mounted on the steering post 61 by U-bolts 62. The lever 58' is actuated by a selected lever shaft 63 through which the rod 64 is actuated.

With these parts the vacuum cylinder assembly with the connecting lines associated therewith may be removed and the transmission operating levers directly operated by the gear shift control rod 11 through the lever 10 as illustrated particularly in Figures 1 and 3.

It will be understood that modifications may be made in the design and arrangement of the parts without departing from the spirit of the invention.

What is claimed is:

1. In a gear shift attachment for motor vehicles, the combination which comprises an elongated flat bar having an offset end and a U-shaped end, an inwardly offset strap having a bolt hole in the upper end extended upwardly from the upper edge of the bar and positioned midway of the length thereof, said offset end of the bar having a bolt hole therethrough and both sides of the U-shaped end having aligned bolt holes therethrough and substantially semi-circular recesses in the upper surfaces positioned with the centers of radii thereof in a vertical plane extended through the centers of the bolt holes in the arm and section of the bar following the said U-shaped end, a gear shift control rod having a threaded upper end and an arcuate lower end and having an eye on the lower end, a bolt connecting the lower end of said rod to the offset end of the bar, and an extension carried by the said threaded end of the gear shift control rod for attaching the gear shift control rod to a control shift lever on the lower end of a shaft extended from a gear shift lever on a steering wheel post of a vehicle in which the attachment is installed.

2. In a gear shift attachment for motor vehicles, the combination which comprises an elongated flat bar having a U-band on one end with a plurality of spaced recesses in the upper edges of the arms of the U and with bolt holes extended through the said arms whereby the U-shaped end of the bar is attached to the transmission operating lever of the transmission of a motor vehicle, said bar being provided with an offset section on the end opposite to that in which the U-bend is formed and said offset section having a bolt hole therein for attaching the end of the bar to a gear shift control rod of the vehicle, said bar also having an upwardly extending offset strap with a bolt hole in the upper end thereof for attaching the strap and bar to an arm extended from one of the transmission operating levers of the vehicle.

ELMER F. DALBY.

REFERENCES CITED

The following references are of record in the file of this patent:

UNITED STATES PATENTS

| Number | Name | Date |
| --- | --- | --- |
| 2,180,579 | Butzbach | Nov. 21, 1939 |
| 2,275,779 | MacPherson | Mar. 10, 1942 |
| 2,301,484 | Wahlberg | Nov. 10, 1942 |